United States Patent Office 3,519,612
Patented July 7, 1970

3,519,612
POLYMERIZATION OF BUTADIENE USING A CATALYTIC MIXTURE OF A LITHIUM ALUMINUM HYDRIDE/ALUMINUM TRICHLORIDE REACTION PRODUCT PLUS A COBALT SALT OF A CARBOXYLIC ACID
Morris Gippin, Fairlawn Village, Ohio, assignor to The Firestone Tire & Rubber Company, Akron, Ohio, a corporation of Ohio
No Drawing. Continuation-in-part of application Ser. No. 394,060, Sept. 2, 1964. This application June 19, 1968, Ser. No. 738,134
Int. Cl. C08d 3/06
U.S. Cl. 260—94.3      4 Claims

ABSTRACT OF THE DISCLOSURE

Butadiene-1,3 is polymerized in the presence of a catalyst comprising (A) A separately preformed reaction product of:    Mols per mol of lithium aluminum hydride A(1)
    (1) Lithium aluminum hydride _____ 1.0
with
    (2) Aluminum trichloride _____ 0.5–5.0
plus
(B) A hydrocarbon-soluble cobalt salt of a carboxylic acid _____ .001–1.0

The products are characterized by a simultaneous concurrence of the following desirable properties: high content of cis-1,4 structure; sufficiently low molecular weight (less than 3.0 dilute solution viscosity) so as to be readily workable on conventional rubber working machinery; and zero, or substantially zero, gel content.

CROSS REFERENCES

This application is a continuation-in-part of my copending application Ser. No. 394,060, filed Sept. 2, 1964.

BACKGROUND OF THE INVENTION

This invention relates to a process for the polymerization of butadiene-1,3 to yield polymeric products high in cis-1,4 structure, and sufficiently low in molecular weight to be easily processible, and substantially free from gel content.

Heretofore conjugated diolefins have been polymerized in the presence of catalysts comprising aluminum alkyl compounds plus cobalt salts. This process suffers from a disadvantage that the alkyl aluminums employed are quite flammable and hazardous to use. Moreover, with these catalysts, it is difficult to secure, in the polymeric products, maximal cis-1,4 structure coupled simultaneously with workable low molecular weights and low gel content. It has been proposed (Balas 3,067,189) to polymerize butadiene with a catalyst produced by mixing unreacted lithium aluminum hydride with cobalt dichloride which had been treated with aluminum chloride; however this gave uncontrollable reactions and products.

Accordingly it is an object of this invention to provide a new and improved process for the manufacture of polymers with conjugated diolefins having high cis-1,4 content.

Another object is to provide such a process which will not be dependent upon the relatively hazardous aluminum hydrocarbon compounds.

A further object is to provide such a process which will be productive of polymers having simultaneously maximal cis-1,4 structure and workable low molecular weights.

SYNOPSIS OF THE INVENTION

The above and other objects are secured in accordance with this invention in a process which comprises contacting butadiene with a catalytic composition comprising:

Table A

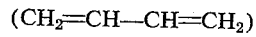

(A) An initially separately prepared reaction product of:    Mols per mol of lithium aluminum hydride
    (1) Lithium aluminum hydride _____ 1.0
with
    (2) Aluminum trichloride _____ 0.5–5.0
plus
(B) A hydrocarbon-soluble salt of a carboxylic acid _____ .001–1.0

The resulting products are characterized by elevated values of cis-1,4 content (95–98+%) while nevertheless having molecular weights sufficiently low to permit the working of the polymer upon mills, banburys, extruders, calenders and other conventional rubber-working machinery. The products are also substantially free from gel content. The process may be carried out under mass polymerization conditions, in which the undiluted conjugated diolefin, in liquid or vapor form, is contacted with the catalyst. Most commonly the polymerization will be carried out with the conjugated diolefin dissolved in a suitable inert solvent.

The monomeric material

The monomeric material to be polymerized in accordance with this invention is 1,3-butadiene, i.e.

$$(CH_2=CH-CH=CH_2)$$

hereinafter referred to simply as "butadiene." It will be understood that the butadiene may also be polymerized in admixture with minor proportions, such as not to detract from the essential character of the butadiene-based polymer chain, of monoolefins copolymerizable with the butadiene, such as styrene, ortho-, meta-, para-methylstyrene, alpha-methylstyrene and the like. If these copolymerizable olefins are not present in excessive amounts (say not over 30%, based on the weight of the butadiene plus the monoolefin) the portion of the polymeric chains derived from the butadiene will have the characteristics of the polymeric chains produced from the unmixed butadiene in accordance with this invention, i.e., it will be characterized by maximal cis-1,4 structure, workably low molecular weights, and freedom from gel. The polymeric products produced in accordance with this invention may be used in any of the applications in which synthetic rubbers have heretofore been used, i.e., they may be compounded with vulcanizing agents and cured to form pneumatic tires, electrical insulation, power transmission and conveyor belting, resilient mountings, gaskets, weather stripping and the like.

The reaction products (A)

As noted above, thees are products produced by mixing lithium aluminum hydride ($LiAlH_3$) with aluminum trichloride ($AlCl_3$) preferably in an inert hydrocarbon solvent such as discussed hereinbelow under "The Polymerization Procedure and Properties of the Polymers." As will appear from the experiments described hereinafter, it is important that the lithium aluminum hydride and aluminum trichloride form their reaction product before they come into contact with the cobalt compound. To this end, the reaction mixture should be aged for a substantial period of time, say half an hour or more, preferably with grinding or agitation, to allow the various molecular species to come largely to equilibrium.

The cobalt compound (B)

This may be any of the various divalent cobaltous salts of carboxylic acids which salts must be somewhat soluble [i.e., are soluble to the extent of about 0.06 or more millimols per 100 milliliters of hydrocarbon solvents] in hydrocarbon media such as discussed below under "The Polymerization Procedure and Properties of the Polymers," such as the higher fatty acid salts of cobalt on the order of cobaltous octoate, cobaltous oleate, cobaltous stearate, cobaltous naphthenate, and the like.

The preparation of the catalysts and the proportioning of the ingredients thereof As noted above, the reaction product of lithium aluminum hydride and aluminum trichloride is preformed some time in advance of the polymerization by mixing these two components together in the absence of the cobalt compound, and allowing them to age and equilibrate over the intervening time. The catalyst proper is then prepared by mixing (A) the separately previously formed reaction product with (B) the cobalt compound. The order in which the entities (A) and (B) enter the reaction zone is not material—(A) may precede (B), (B) may preceed (A), or both may be added simultaneously. The butadiene may be present during the preparation of the catalyst, or the catalyst may be prepared in the absence of butadiene and added thereto when it is desired to effect polymerization. An inert hydrocarbon solvent such as discussed below under "The Polymerization Procedure and Properties of the Polymers" is preferably present, and suitable agitation should be supplied to insure intermixture and contact of the ingredients. The proportions of the ingredients to be used in the preparation of the catalysts is indicated hereinabove in Table A. The absolute amount of the catalyst has no theoretical minimum; so long as there is any measurable proportion of the catalyst present, polymerization will take place. As a practical matter, however, there will always be trace impurities present which will consume the catalyst if it is supplied in infinitesimal amounts; accordingly a sufficient amount of catalyst should be provided so as to entrain at least 1.0 millimol of the lithium aluminum hydride per 100 grams of butadiene. Not more than about 100 millimols of lithium aluminum hydride per 100 grams of butadiene should be entrained in the catalyst, as the properties of the butadiene deteriorate above this level.

The polymerization procedure and properties of the polymer

The polymerization is carried out by contacting the butadiene with the catalyst, at temperatures in the range —40° C. to 150° C. although higher or lower temperatures may be used. A preferred range is −5° C. to +10° C. Usually there will be present an inert solvent which may be, for instance, an aromatic or aliphatic hydrocarbon solvent. The aromatic solvents are preferred, examples of these being benzene, toluene, the various xylenes, and mixtures thereof. Likewise there may be used aliphatic hydrocarbons such as pentane, heptane, mixtures of hydrocarbon solvents such as petroleum ether, kerosene, paraffin oil and the like. The reaction medium should be as far as possible free from polar compounds which would react with and destroy the catalyst. Preferably but not necessarily, sufficient pressure is applied to maintain the butadiene in the liquid phase. Likewise, the polymerization process should be agitated to keep the catalyst particles dispersed throughout the polymerization mass, at least until the viscosity has increased to such a degree that the catalyst will no longer settle out. When the polymerization has proceeded to the desired degree, the polymerized butadiene is recovered in any suitable way; for instance, if the reaction has been carried out in a hydrocarbon solvent, the resultant solution can be mixed with methyl ethyl ketone, methanol, isopropanol or other non-solvent for the polymer, which will precipitate in the form of a coagulum which can be washed, milled, calendered, extruded, etc. upon conventional rubber machinery. The polymer may also be recovered by evaporating the solvent, for instance by injection into hot water, or passing through a heated extruder, drum drier apparatus or the like.

The butadiene polymers produced in accordance with this invention will be found to have the butadiene units polymerized therein to a large extent, say 95% or better, in the cis-1,4 configuration. Such high values of cis-1,4 configuration can only be obtained in prior art catalytic systems by so adjusting the parameters of the polymerization system that the molecular weight becomes excessively high, and the polymer correspondingly difficult to handle on rubber working machinery such as mills, banburys, extruders and the like. The polymers produced by the process of this invention have combined, along with their high cis-1,4 values, desirably low molecular weights, commonly having dilute solution viscosity values less than 3.0. The polymers will also contain little or no gel content.

The proportions of cis-1,4-, trans-1,4- and 1,2-configurations reported hereinafter were determined by infrared analysis by measurement of the transmission of film samples at wavelengths for the several structures, and using extinction coefficients, as follows:

TABLE I

| Structure | Cis-1,4— | Trans-1,4— | 1,2 |
|---|---|---|---|
| Wavelength (#) | 7.6 | 10.36 | 11.0 |
| Extinction coefficient | 7.6 | 110 | 140 |

The amounts of cis-1,4-, trans-1,4- and 1,2-additions are determined with the above extinction coefficients using baseline optical densities at each of the three wavelengths as described in Belgian Pat. 575,671 and Italian Pats. 588,825 and 592,477. The polymers may be vulcanized by substantially the same sulfur, sulfur-and-accelerator, peroxide and other systems by which conventional butadiene-based rubbers are vulcanized, to yield products which are useful in pneumatic tires (particularly as the tread and body stocks thereof), resilient rubber mountings, torsion springs and the like.

With the foregoing general discussion in mind, there are given herewith detailed examples of the practice of this invention. All parts are given by weight.

EXAMPLE I

Benzene—900 grams
Butadiene—100 grams
Lithium aluminum hydride suspension (LiAlH$_4$, 1 molar, in hexane)—7.5 ml.
Aluminum trichloride suspension (1 molar, in hexane)—12.5 ml.
Cobaltous octoate solution (.0207 molar, in benzene)—2.0 ml.

The foregoing recipe provides mol proportions of LiAlH$_3$/AlCl$_3$/cobaltous octoate of 1.0/1.67/.0055. The lithium aluminum hydride and aluminum trichloride preparations were placed in an eight-ounce beverage bottle along with several half-inch glass marbles, and the bottle was flushed with dry nitrogen, and sealed with a crown cap provided with a nitrile rubber liner. The bottle was then placed on a ball-mill roller-cradle, and revolved for 18 hours. The butadiene and benzene were charged into a 32-ounce beverage bottle, which was purged with dry nitrogen, and prechilled for 2 hours at 5° C. Thereafter (A) the ball-milled mixture of lithium aluminum hydride and aluminum chloride and (B) the cobaltous octoate solution were charged in the order named under a blanket of dry nitrogen. The 32-ounce bottle was then sealed, and revolved on a polymerizer wheel in a bath at 5° C. for 19 hours, at the end of which time the solution in the bottle had become quite viscous. The bottle was then cut open, and the solution coagulated by rapid stirring in isopropanol containing phenyl beta-naphthylamine. The polymer was washed on a mill with water, and dried in a vacuum oven at 50° C. There was obtained an 87.5% yield of a rubbery polybutadiene which showed, on infrared analysis, 98.2% cis-1,4, 1.0% trans-1,4 and 0.8%

1,2-unsaturation. The dilute solution viscosity was 2.73, and the gel content was 0.0%.

EXAMPLE II (For comparison: not in accordance with this invention)

Benzene—900 grams
Butadiene—100 grams
Lithium aluminum hydride suspension (LiAlH$_4$, 1 molar, in hexane)—7.5 grams
Aluminum trichloride suspension (1 molar, in hexane)—12.5 ml.
Cobaltous octoate solution (.0207 molar, in benzene)—2.0 ml.

The benzene and butadiene were charged into a 32-ounce bottle under a blanket of dry nitrogen, and the bottle and contents pre-chilled for two hours at 5° C. Thereafter the remaining ingredients were charged under a blanket of helium, and the bottle sealed with a crown cap provided with a nitrile rubber liner. The bottle was then revolved on a polymerizer wheel in a bath at 5° C. for 19 hours, at the end of which time the contents of the bottle had become solid. The polymer was recovered as described in Example I. There was obtained a 92.6% yield of a rubbery polybutadiene showing, on infra-red analysis, 94.9% cis-1,4-, 3.7% trans-1,4- and 1.5% of 1,2-unsaturation. The polymer had a dilute solution viscosity of 0.48 and a gel content of 90.5%.

From the foregoing general discussion and detailed experimental examples, it will be seen that this invention provides a novel and efficient method for the preparation of rubbery diolefin polymers which are high in cis-1,4 structure, have molecular weights sufficiently low for satisfactory processing, and contain substantially no gel. The process makes use of the inexpensive and readily available lithium aluminum hydride and cobalt salts.

What is claimed is:

1. A Process of polymerizing butadiene to yield a product having 95–98.2% cis-1,4 structure, having a dilute solution viscosity less than 3.0 so as to permit working upon conventional rubber working machinery, and being substantially free from gel, which comprises contacting the butadiene with a catalyst comprising:

|     | Mols per mol of lithium aluminum hydride A(1) |
| --- | --- |
| (A) A preliminary separately preformed reaction product of the following two reactants: | |
| (1) Lithium aluminum hydride | 1.0 |
| with | |
| (2) Aluminum trichloride | 0.5–5.0 |
| plus | |
| (B) A hydrocarbon-soluble cobalt salt of a higher fatty acid | .001–1.0 |

2. Process according to claim 1, wherein the cobalt salt is cobaltous octoate.

3. Process according to claim 2, wherein the aluminum trichloride is employed to the extent of about 1.67 mol.

4. Process according to claim 2 in which the cobaltous octoate is employed to the extent of about .0055 mol.

References Cited

UNITED STATES PATENTS

| | | | |
| --- | --- | --- | --- |
| 2,977,349 | 3/1961 | Brockway | 260—94.3 |
| 3,067,189 | 12/1962 | Balas | 260—94,3 |
| 3,222,348 | 12/1965 | Duck et al. | 260—94.3 |

JOSEPH L. SCHOFER, Primary Examiner

R. A. GAITHER, Assistant Examiner

U.S. Cl. X.R.

260—82.1